(12) United States Patent
Golov

(10) Patent No.: US 12,724,540 B2
(45) Date of Patent: Sep. 1, 2026

(54) WEAR LEVELING FOR NON-VOLATILE MEMORY USING DATA WRITE COUNTERS

(71) Applicant: Micron Technology, Inc., Boise, ID (US)

(72) Inventor: Gil Golov, Backnang (DE)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/470,356

(22) Filed: Sep. 19, 2023

(65) Prior Publication Data

US 2024/0036737 A1 Feb. 1, 2024

Related U.S. Application Data

(63) Continuation of application No. 16/204,811, filed on Nov. 29, 2018, now Pat. No. 11,782,605.

(51) Int. Cl.

| | |
|---|---|
| ***G06F 3/06*** | (2006.01) |
| ***G07C 5/04*** | (2006.01) |
| *G05D 1/00* | (2006.01) |

(52) U.S. Cl.

CPC .......... *G06F 3/0616* (2013.01); *G06F 3/0659* (2013.01); *G06F 3/0679* (2013.01); *G07C 5/04* (2013.01); *G05D 1/02* (2013.01)

(58) Field of Classification Search

None

See application file for complete search history.

(56) References Cited

U.S. PATENT DOCUMENTS

| | | | |
|---|---|---|---|
| 5,546,579 A | 8/1996 | Josten et al. | |
| 5,815,093 A | 9/1998 | Kikinis | |
| 5,924,126 A * | 7/1999 | Rosenthal | G06F 12/1081 711/E12.067 |
| 5,936,315 A | 8/1999 | Lais | |
| 5,956,703 A | 9/1999 | Turner et al. | |
| 6,073,063 A | 6/2000 | Leong Ong et al. | |
| 6,345,219 B1 | 2/2002 | Klemens | |

(Continued)

FOREIGN PATENT DOCUMENTS

| | | |
|---|---|---|
| CN | 1892705 | 1/2007 |
| CN | 101414388 | 4/2009 |

(Continued)

OTHER PUBLICATIONS

"Everything You Need to Know About SLC, MLC, and TLC NAND Flash", MyDigitaldiscount.com, printed on Nov. 27, 2017.

(Continued)

*Primary Examiner* — Stephanie Wu

(74) *Attorney, Agent, or Firm* — Greenberg Traurig

(57) ABSTRACT

A memory system has a controller (e.g., CPU, FPGA, or GPU) and recording segments in a non-volatile memory (e.g., a flash memory device) used by the controller to store data. The controller is configured to: maintain data write counters for the recording segments; select a first segment of the recording segments for recording data from a host system, wherein selecting the first segment comprises scanning the data write counters to identify a first data write counter corresponding to the first segment; receive, from the host system, data to be recorded by the non-volatile memory; and write the received data to the selected first segment.

17 Claims, 5 Drawing Sheets

(56) References Cited

U.S. PATENT DOCUMENTS 6,490,513 B1 12/2002 Fish et al.
6,629,030 B2 9/2003 Klausner et al.
7,190,882 B2 3/2007 Gammenthaler
7,383,389 B1 6/2008 Bumbulis
7,653,778 B2 1/2010 Merry, Jr. et al.
7,711,461 B2 5/2010 Yokogawa
8,010,248 B2 8/2011 Sano
8,060,718 B2 11/2011 Freitas et al.
8,090,495 B2 1/2012 Fink et al.
8,122,185 B2 2/2012 Merry, Jr. et al.
8,160,764 B2 4/2012 Choi et al.
8,312,207 B2 11/2012 Merry, Jr. et al.
8,321,084 B2 11/2012 Yamashita et al.
8,452,481 B2 5/2013 Ishiko et al.
8,527,778 B2 9/2013 Kim
8,531,793 B2 9/2013 Bandic et al.
8,601,202 B1 12/2013 Melcher et al.
8,688,915 B2 4/2014 Daly et al.
8,725,312 B2 5/2014 Mori et al.
8,793,431 B2 7/2014 Bandic et al.
8,930,625 B2 1/2015 Daly et al.
8,930,668 B2 1/2015 Engle et al.
8,959,280 B2 2/2015 Yu et al.
8,990,874 B2 3/2015 Huang
9,298,603 B2 3/2016 Schuette
9,329,919 B2 5/2016 Pickel et al.
9,365,162 B2 6/2016 Nix
9,802,541 B2 10/2017 Nix
9,902,062 B2 2/2018 Grotmol et al.
10,102,696 B2 10/2018 Iwaasa
10,214,213 B2 2/2019 Kojima
10,229,547 B2 3/2019 Isozaki et al.
10,248,627 B2 4/2019 Yang et al.
10,308,181 B2 6/2019 Nix
10,318,495 B2 6/2019 Talagala et al.
10,319,039 B1 6/2019 Konrardy et al.
10,365,835 B2 7/2019 Monteleone et al.
10,427,655 B2 10/2019 Nix
10,521,976 B2 12/2019 Shin et al.
10,614,639 B2 4/2020 Iwaasa
10,636,229 B2 * 4/2020 Hansel .................. G11C 5/141
10,846,955 B2 11/2020 Golov
10,853,199 B2 12/2020 Paley et al.
10,878,510 B2 12/2020 Perl et al.
10,909,782 B1 * 2/2021 Natanzon ............ G07C 5/0841
11,003,537 B2 5/2021 Troia et al.
11,094,148 B2 8/2021 Sato
11,182,986 B2 11/2021 Sato
11,370,123 B2 6/2022 Lee
11,373,466 B2 6/2022 Golov
11,410,475 B2 8/2022 Golov
11,676,431 B2 6/2023 Golov
11,733,873 B2 8/2023 Szubbocsev
11,756,353 B2 9/2023 Sato
11,782,605 B2 10/2023 Golov
12,087,110 B2 9/2024 Golov
2002/0107619 A1 8/2002 Klausner et al.
2002/0120856 A1 8/2002 Schmidt et al.
2002/0131768 A1 9/2002 Gammenthaler
2002/0154543 A1 10/2002 Conley et al.
2002/0183905 A1 12/2002 Maeda et al.
2004/0113763 A1 6/2004 Bendavid et al.
2004/0263647 A1 12/2004 Yamaguchi
2006/0190419 A1 8/2006 Bunn et al.
2006/0192658 A1 8/2006 Yamamura
2006/0261931 A1 11/2006 Cheng
2007/0132773 A1 * 6/2007 Plante ................. G07C 5/0891 345/564
2007/0150644 A1 6/2007 Pinto et al.
2007/0208904 A1 9/2007 Hsieh et al.
2007/0260811 A1 11/2007 Merry, Jr. et al.
2007/0294490 A1 12/2007 Freitas et al.
2008/0133088 A1 6/2008 Yamada
2008/0140918 A1 * 6/2008 Sutardja ............. G06F 12/0246 711/E12.001
2008/0187163 A1 8/2008 Goldstein et al.
2008/0208533 A1 8/2008 Yokogawa
2008/0221751 A1 9/2008 Fink et al.
2008/0234890 A1 9/2008 Okada et al.
2008/0255723 A1 10/2008 Sano
2009/0240392 A1 9/2009 Yamashita et al.
2010/0030540 A1 2/2010 Choi et al.
2010/0060734 A1 3/2010 Chou
2010/0138094 A1 6/2010 Stark et al.
2010/0223423 A1 * 9/2010 Sinclair ................ G06F 3/0679 711/E12.001
2010/0250061 A1 9/2010 Toyofuku et al.
2010/0256867 A1 10/2010 Breuer et al.
2010/0332072 A1 12/2010 Ishiko et al.
2011/0087893 A1 4/2011 Kim
2011/0112719 A1 * 5/2011 Marumoto ............. G01F 9/008 340/439
2011/0131364 A1 6/2011 George Gordon
2011/0153913 A1 6/2011 Huang et al.
2012/0014013 A1 1/2012 Bandic et al.
2012/0072644 A1 3/2012 Asano et al.
2012/0150527 A1 6/2012 Creedon et al.
2012/0198335 A1 8/2012 Huang
2012/0210021 A1 8/2012 Flynn et al.
2012/0216079 A1 8/2012 Fai et al.
2012/0254266 A1 10/2012 Printezis et al.
2012/0254267 A1 10/2012 Printezis et al.
2012/0284587 A1 11/2012 Yu et al.
2013/0036282 A1 2/2013 Kawachiya et al.
2013/0041522 A1 * 2/2013 Mori ................... G07C 5/0808 701/1
2013/0124787 A1 5/2013 Schuette
2013/0135926 A1 5/2013 Roohparvar et al.
2013/0151779 A1 6/2013 Daly et al.
2013/0246703 A1 9/2013 Bandic et al.
2014/0089264 A1 3/2014 Talagala et al.
2014/0136809 A1 5/2014 Engle et al.
2014/0320655 A1 10/2014 Kim
2014/0320659 A1 10/2014 Kaneyoshi
2015/0002674 A1 1/2015 Kleve et al.
2015/0347038 A1 12/2015 Monteleone et al.
2016/0063776 A1 3/2016 Chronowski et al.
2016/0342344 A1 11/2016 Kankani et al.
2017/0017415 A1 * 1/2017 Walker ............... G06F 11/1441
2017/0021835 A1 * 1/2017 Kojima ................ B60W 10/20
2017/0031906 A1 2/2017 Yang et al.
2017/0111332 A1 4/2017 Tschache et al.
2017/0148237 A1 * 5/2017 Iwaasa ................ G07C 5/0841
2017/0237937 A1 8/2017 Motohashi et al.
2017/0248497 A1 8/2017 Wewers
2017/0278320 A1 9/2017 Isozaki et al.
2017/0323201 A1 * 11/2017 Sutskever ............ G06F 3/0653
2018/0007323 A1 1/2018 Botusescu et al.
2018/0009330 A1 1/2018 Ricci
2018/0027680 A1 1/2018 Kumar et al.
2018/0162301 A1 6/2018 Meng et al.
2018/0285197 A1 10/2018 Kim et al.
2018/0300816 A1 10/2018 Perl et al.
2019/0004960 A1 1/2019 Wang et al.
2019/0080526 A1 3/2019 Shin et al.
2019/0111876 A1 * 4/2019 Siddiqui ............. B60R 21/0136
2019/0163387 A1 * 5/2019 Jin ....................... G06F 3/0634
2019/0171372 A1 6/2019 Szubbocsev
2019/0171389 A1 6/2019 Muthiah et al.
2019/0180502 A1 * 6/2019 Englard ................. G01S 7/417
2019/0197799 A1 6/2019 Zwissler et al.
2019/0287319 A1 9/2019 Golov
2019/0299860 A1 * 10/2019 Nix ........................ B60R 1/002
2019/0302766 A1 10/2019 Mondello et al.
2019/0354838 A1 11/2019 Zhang et al.
2019/0371087 A1 12/2019 Shin et al.
2019/0385383 A1 12/2019 Sato
2020/0004460 A1 * 1/2020 Gould .................. G06F 3/0613
2020/0111270 A1 4/2020 Sato
2020/0118359 A1 4/2020 Sato
2020/0174677 A1 6/2020 Golov
2020/0211304 A1 7/2020 Keum et al.
2020/0250902 A1 8/2020 Golov
2020/0337631 A1 10/2020 Sahin

(56) References Cited

U.S. PATENT DOCUMENTS

| | | | |
|---|---|---|---|
| 2021/0090356 | A1 | 3/2021 | Golov |
| 2021/0094587 | A1 | 4/2021 | Pilly et al. |
| 2021/0358234 | A1 | 11/2021 | Sato |
| 2023/0122447 | A1 | 4/2023 | Trehan |
| 2023/0386277 | A1 | 11/2023 | Golov |
| 2023/0386278 | A1 | 11/2023 | Sato |
| 2023/0393753 | A1 | 12/2023 | Szubbocsev |
| 2024/0386718 | A1 | 11/2024 | Maxell |
| 2024/0428628 | A1 | 12/2024 | Golov |

FOREIGN PATENT DOCUMENTS

| | | |
|---|---|---|
| CN | 102956045 | 3/2013 |
| CN | 103514645 | 1/2014 |
| CN | 104658056 | 5/2015 |
| CN | 205003749 | 1/2016 |
| CN | 105976450 | 9/2016 |
| GB | 2399247 | 9/2004 |
| JP | 2000-128030 | 5/2000 |
| JP | 2002118643 | 4/2002 |
| JP | 2006-127206 | 5/2006 |
| JP | 2007153033 | 6/2007 |
| JP | 2007-280407 | 10/2007 |
| JP | 2013041355 | 2/2013 |
| KR | 10-2007-0074388 | 7/2007 |
| KR | 10-1810539 | 12/2017 |
| WO | 2007037749 | 4/2007 |
| WO | 2008007878 | 1/2008 |

OTHER PUBLICATIONS

"Wear Leveling", Wikipedia, printed on Nov. 27, 2017.

Asim, Muhammad, et al., "Physical Unclonable Functions and Their Applications to Vehicle System Security." IEEE, 2009.

Extended European Search Report, EP19766799.1, mailed on May 7, 2021.

International Search Report and Written Opinion, PCT/US2019/019562, mailed Jun. 3, 2019.

International Search Report and Written Opinion, PCT/US2019/019651, mailed Jun. 7, 2019.

Kevin L. Priddy, Artificial Neural Networks, An Introduction, Spie press, p. 16 (Year: 2005).

Wikipedia, Normalization (statistics), https://en.wikipedia.org/wiki/Normalization_(statistics) (Year: 2014).

* cited by examiner

WEAR LEVELING FOR NON-VOLATILE MEMORY USING DATA WRITE COUNTERS

RELATED APPLICATIONS

The present application is a continuation application of U.S. patent application Ser. No. 16/204,811, filed Nov. 29, 2018 and issued as U.S. Pat. No. 11,782,605 on Oct. 10, 2023, the entire disclosure of which application is hereby incorporated herein by reference.

FIELD OF THE TECHNOLOGY

At least some embodiments disclosed herein relate to memory systems in general, and more particularly, to wear leveling for non-volatile memory devices.

BACKGROUND

Autonomous vehicles typically include many sensors to assist in controlling the autonomous vehicle. In the case of an accident, collision, or near collision involving the vehicle, there may be a benefit from reviewing the sensor data recorded just prior to and/or during the accident to assist in potentially determining the cause of the accident, and/or whether there may have been a vehicle failure. In the event of a power loss during the accident, vehicle sensor data stored in a volatile memory may be lost.

An event data recorder (EDR) for an automotive vehicle, sometimes referred to informally as an automotive "black box", is a device installed in some vehicles to record information related to vehicle crashes or accidents. In one example, automobile original equipment manufacturers (OEMs) that manufacture autonomous vehicles are legally required to install a black box data recorder that records the last 30 seconds before an accident occurs. It is intended that this data be used to reproduce the root cause of the accident.

In another example, in diesel trucks, EDRs are triggered by electronically sensed conditions in certain vehicle components (e.g., an engine or brake component). Some of these conditions may occur due to an accident. Data from these devices can be collected after a crash and analyzed to help determine what the vehicles were doing before and during the crash or event.

Some EDRs continuously record data, overwriting the previous few minutes until an accident causes recording to stop (e.g., due to loss of power). Other EDRs are activated by crash-like events (e.g., sudden change in velocity) and may continue to record until an accident has ended. EDRs may record a wide range of data such as whether brakes were applied, and speed at time of impact. Existing EDRs store the information internally on an EEPROM until recovered from the EDR module.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
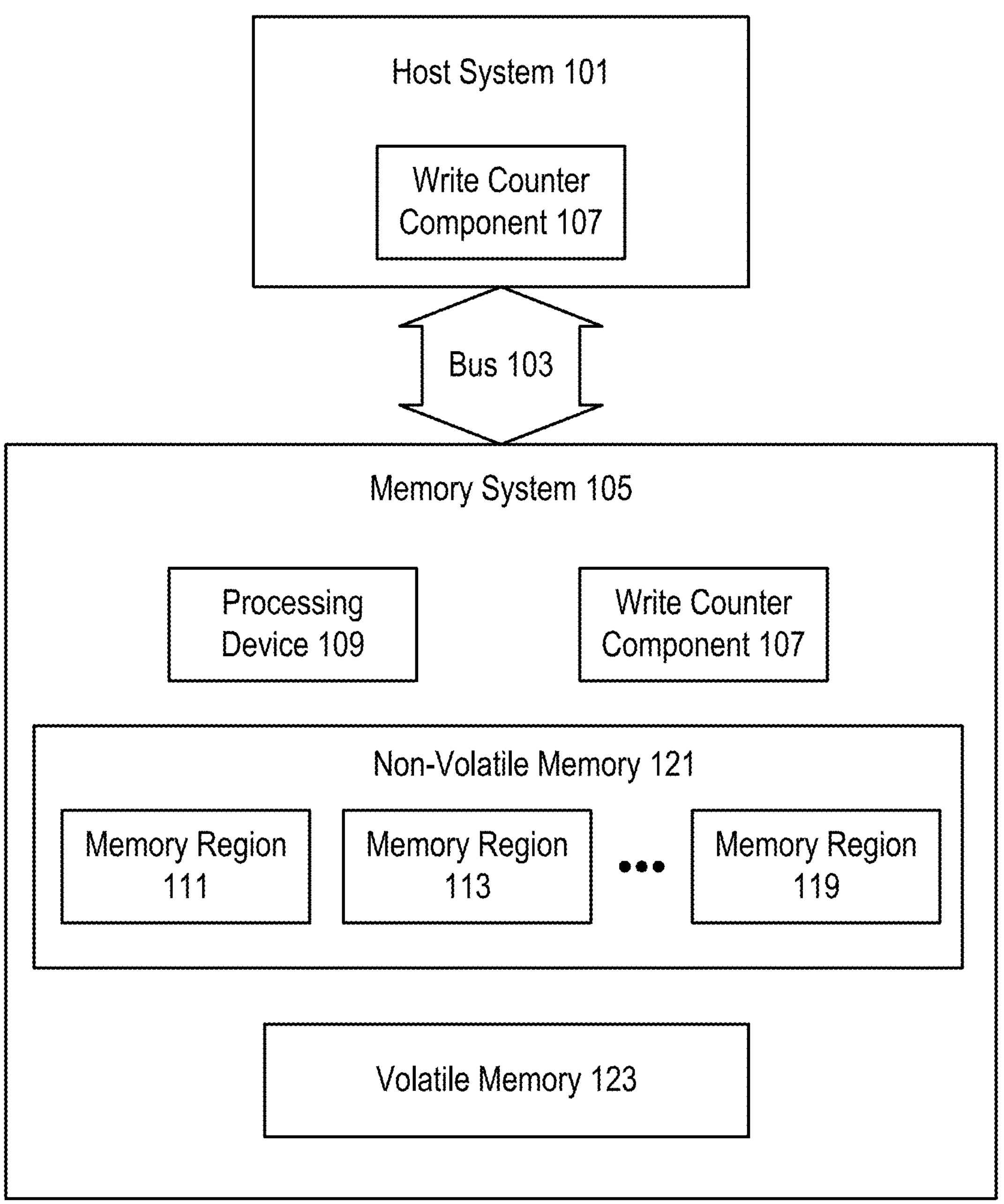
FIG. 1 illustrates an example computing system having a write counter component, in accordance with some embodiments of the present disclosure.

At least some aspects of the present disclosure are directed to wear leveling in non-volatile memory devices. In one example, the memory device is a flash memory. In one example, the memory device is a black box recorder used in an autonomous vehicle. For example, the autonomous vehicle is a car, truck, boat, plane, helicopter, or unmanned aerial vehicle (e.g., a drone).

Prior controllers for flash memory devices (e.g., using NAND flash memory) perform wear leveling using a translation table. Wear leveling is done, for example, to more equally distribute the number of program/erase cycles across the memory storage media to further extend the memory device's useful lifetime. A translation table between logical blocks (e.g., logical blocks visible to an application) and physical blocks of the memory device is often used either dynamically or statically. The translation table is managed by the controller.

Wear leveling is used because the lifetime of each flash storage cell decreases each time that data is written to the cell (for programming the cell). When the number of program cycles reaches a certain limit, which varies for each type of cell (e.g., 3,000 program cycles), the cell has reached the end of its useful life.

Prior wear leveling approaches attempt to equally spread data over physical locations (e.g., flash storage cells) to evenly wear the cells. This is done to avoid having a small number of cells prematurely fail before other cells, and thus end the useful life of a memory storage device. For example, prior flash controllers write to a different physical location of the memory for every write operation in order to evenly distribute the data. In addition, prior flash controllers are designed to handle random data.

It has been recognized that several technical problems can exist due to use of a translation table as in prior approaches. For example, prior flash controllers use a translation table to translate between logical blocks of an application (e.g., executing on a host system) and physical blocks of a flash memory device. The controller must expend significant processing effort and time to run the translation table in real time. If the memory device must handle a non-stop stream of data, the translation table processing overhead can sometimes reduce the speed at which new data can be recorded. For example, the performance of a black box recorder that records a sequential data stream is reduced when using a translation table.

In one example, when a prior flash controller attempts to handle a data stream of sequential data over a long time period, wear leveling background operations place a processing burden on the controller. For example, a memory device has buffers to receive new data. In some cases, when the controller becomes overloaded due at least in part to wear leveling processing, the controller is not able to handle new incoming data. In such a case, the controller sends a signal to a host device to stop sending new data (e.g., because the controller is busy with maintenance processing and the buffers are full).

In one example, the controller can become busy due to copying blocks from one physical location of a memory device to another physical location. This dramatically slows performance for sequential write operations (e.g., when handling data from S-Video recorders over long time periods).

At least some aspects of the present disclosure address the above and other deficiencies by improving the wear leveling mechanism. In particular, for memory storage devices recording a stream of data that is written sequentially, it has been appreciated that the wear leveling mechanism does not require a translation table. This significantly reduces the processing overhead required of the controller during operation.

Instead of using a translation table, various embodiments of the present disclosure use data write counters to select a recording segment into which new data is recorded. The data write counters are used to keep track of the quantity of data written to various recording segments of a memory device. A recording segment into which a lower quantity of data has been previously written is selected for writing new data.

In one example, a data stream from a black box recorder is written to the selected recording segment. The data is written in the recording segment in a cyclic mode.

In one embodiment, instead of a controller for a flash memory device using a logical to physical translation table, the controller divides a number of flash physical blocks into recording segments (as mentioned above). For example, if equally divided, a recording segment size in blocks is a total number of blocks for the memory device divided by the number of recording segments used. In other examples, the sizes of the recording segments can be of different sizes. For example, a different size can be used for different types of flash storage cells (e.g., when the memory device uses several types of cells for recording data). In one example, a block can have a size of hundreds to thousands of bits. In another example, a block can have a size of 2K to 16K bytes or greater.

The controller maintains a data write counter for every recording segment. The data write counter is incremented as data is written to a particular recording segment so that the program/erase cycles endured by that segment can be tracked.

In one example, the memory device is part of a black box recorder. When the black box recorder receives a recording command (e.g., when an autonomous mode of a vehicle is activated, or a vehicle is turned on), the data stream to the flash memory device is written in a cyclic mode within the currently-active recording segment. The data is written directly to physical blocks within the active recording segment. When the recording segment becomes full, previously-recorded data is replaced by new data from the incoming data stream. The data write counter for that active recording segment is increased accordingly, such that the counter indicates the quantity of data that has been written to the segment so far (e.g., a lifetime cumulative count of data written to the segment). In one example, the cyclic mode writes data similarly to a cyclic buffer.

In various embodiments, a new active recording segment can be selected based on the occurrence of various events. For example, a recording stop command can be received by the controller of the flash memory device. The stop command can be, for example, triggered by an accident involving the vehicle. In another example, the stop command can be triggered when the vehicle is switched off (e.g., by the user), or when the vehicle exits autonomous navigation mode. Upon the occurrence of one or more of these events, a new active recording segment is selected.

In one embodiment, the new active recording segment is selected based on an evaluation by the controller of the data write counters. For example, the data write counters for each of the recording segments in the memory device can be scanned by the controller. Thus, the controller can determine which of the recording segments has been used to previously program the lowest quantity of data. The recording segment having programmed the lowest quantity of data is selected as the next active recording segment for storing data subsequently received by the memory device. In another example, if the values of multiple data write counters for recording segments having written a minimum quantity of data are determined to have the same value, then the controller can select the active segment randomly from among those segments corresponding to the minimum quantity of data. Other selection criteria can also be used (e.g., based on type of storage cell, type of data previously stored, and/or type of subsequent data to be stored).

Thus, various embodiments of the present disclosure as discussed above provide a write counter component that selects a recording segment using data write counters, and that provides several advantages. For example, use of the write counter component provides a lower cost, simpler controller. The power consumption of the controller is reduced, and the wear leveling mechanism is easier to implement. Further, the memory device exhibits improved sustained write performance due to the elimination of the need for the controller to maintain a logical-to-physical translation table.

More generally, erasable computer storage media, such as Compact Disc-ReWritable, DVD recordable, DVD-RAM, electrically erasable programmable read-only memory (EEPROM), and/or flash memory, have useful service periods limited by the cycles of program and erase to store data. In other embodiments, the write counter component may be used for these types of memory devices.

A program erase (P/E) budget represents a predetermined number of cycles of program and erase that can be performed reliably for recording data in an erasable medium. After the predetermined number of cycles of erasure, the program erase (P/E) budget of such the erasable medium is used up; and as a result, the medium may become unreliable in a statistical sense and thus is considered at the end of its useful service life.

For example, a flash memory device typically has many blocks of memory units. Each of the memory blocks can be programmed and erased separately. The degree of wear of each memory block is proportional to the number of erasure operations performed on the memory block. By using data write counters, wear leveling can be performed in a flash memory such that the operations of erasure are distributed across the memory blocks in the memory device. U.S. Pat. No. 6,850,443 discloses some wear leveling techniques in a mass storage system, the entire disclosure of which is hereby incorporated herein by reference.

Different types of NAND flash memories have been developed. For example, a single level cell (SLC) flash memory has a cell structure that stores a single bit in a reprogrammable cell; a multi level cell (MLC) flash memory has a cell structure that stores multiple bits of data (e.g., two bits) in a reprogrammable cell; a triple level cell (TLC) flash memory has a cell structure that stores three bits of data in a programmable cell; and a quad level cell (QLC) flash memory has a cell structure that stores four bits of data in a programmable cell.

Different types of flash memories have different characteristics in performance, production cost, reliability, and durability. For example, an SLC flash memory has a P/E budget between 90,000 and 100,000 cycles; an MLC flash memory has a P/E budget ranging from 10,000 to 30,000 cycles; and a TLC flash memory has a P/E budget between 3,000 to 5,000 cycles.

Examples of other data that can be stored in a recording segment according to the present disclosure include data associated with an operating system, software, software stacks, program variables, etc. Some of this data such as program variables is generated at run-time by one or more software processes executing on one or more processing devices. Examples of other data that can be stored include data for graphics video buffers, camera input buffers, artificial graphics, deep learning temporary calculations, etc. Such data is typically generated at run-time by one or more software processes during normal operations of the computer.

The write counter component of the present disclosure can be implemented in various computing systems. In one example system, a processing device (e.g., a system-on-chip (SOC), FPGA, CPU, or GPU) of a host system stores run-time data in a non-volatile memory (e.g., cross point memory (such as 3DXP memory) or a SSD).

FIG. 1 illustrates an example computing system having a write counter component 107, in accordance with some embodiments of the present disclosure. A host system 101 communicates over a bus 103 with a memory system 105. A processing device 109 of memory system 105 has read/write access to memory regions 111, 113, . . . , 119 of non-volatile memory 121. In one example, host system 101 also reads data from and writes data to volatile memory 123.

In one example, the processing device 109 [11] and the memory regions 111, 113, . . . , 119 are on the same chip or die. In some embodiments, the memory regions store data used by the host system 101 and/or the processing device 109 during machine learning processing or other run-time data generated by software process(es) executing on host system 101 or on processing device 109.

The computing system includes a write counter component 107 in the memory system 105 that selects a memory region 111 (e.g., a recording segment of flash memory) for recording new data from host system 101. The memory region 111 is selected by scanning data write counters, as described herein. The computing system can further include a write counter component 107 in the host system 101 that coordinates with the write counter component 107 in the memory system 105 to at least facilitate scanning of the write counters and/or selection of the memory region 111.

In one example, volatile memory 123 is used as system memory for a processing device (not shown) of host system 101. In one embodiment, a process of host system 101 selects memory regions by evaluating values from data write counters. In one example, the data write counters can be stored in memory of memory system 105 and/or host system 101. In one example, the host system 101 can select a memory region based in part on data from sensors and/or software processes executing on an autonomous vehicle. In one example, the foregoing data is provided by the host system 101 to processing device 109, which selects the memory region.

In some embodiments, host system 101 or processing device 109 includes at least a portion of the write counter component 107. In other embodiments, or in combination, the processing device 109 and/or a processing device in the host system 101 includes at least a portion of the write counter component 107. For example, processing device 109 [11] and/or a processing device of the host system 101 can include logic circuitry implementing the write counter component 107. For example, a controller or processing device (e.g., a CPU, FPGA, or GPU) of the host system 101, can be configured to execute instructions stored in memory for performing the operations of the write counter component 107 described herein.

In some embodiments, the write counter component 107 is implemented in an integrated circuit chip disposed in the memory system 105. In other embodiments, the write counter component 107 in the host system 101 is part of an operating system of the host system 101, a device driver, or an application.

An example of memory system 105 is a memory module that is connected to a central processing unit (CPU) via a memory bus. Examples of memory modules include a dual in-line memory module (DIMM), a small outline DIMM (SO-DIMM), a non-volatile dual in-line memory module (NVDIMM), etc. In some embodiments, the memory system can be a hybrid memory/storage system that provides both memory functions and storage functions. In general, a host system can utilize a memory system that includes one or more memory regions. The host system can provide data to be stored at the memory system and can request data to be retrieved from the memory system. In one example, a host can access various types of memory, including volatile and non-volatile memory.

The host system 101 can be a computing device such as a controller in a vehicle, a network server, a mobile device, a cellular telephone, an embedded system (e.g., an embedded system having a system-on-chip (SOC) and internal or external memory), or any computing device that includes a memory and a processing device. The host system 101 can include or be coupled to the memory system 105 so that the host system 101 can read data from or write data to the memory system 105. The host system 101 can be coupled to the memory system 105 via a physical host interface. As used herein, “coupled to” generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, etc. The physical host interface can be used to transmit data between the host system 101 and the memory system 105. The physical host interface can provide an interface for passing control, address, data, and other signals between the memory system 105 and the host system 101. FIG. 1 illustrates a memory system 105 as an example. In general, the host system 101 can access multiple memory systems via a same communication connection, multiple separate communication connections, and/or a combination of communication connections.

The host system 101 can include a processing device and a controller. The processing device of the host system 101 can be, for example, a microprocessor, a central processing unit (CPU), a processing core of a processor, an execution unit, etc. In some instances, the controller of the host system can be referred to as a memory controller, a memory management unit, and/or an initiator. In one example, the controller controls the communications over bus 103 between the host system 101 and the memory system 105.

A controller of the host system 101 can communicate with a controller of the memory system 105 to perform operations such as reading data, writing data, or erasing data at the memory regions of non-volatile memory 121. In some instances, the controller is integrated within the same package of the processing device 109. In other instances, the controller is separate from the package of the processing device 109. The controller and/or the processing device can include hardware such as one or more integrated circuits and/or discrete components, a buffer memory, a cache memory, or a combination thereof. The controller and/or the processing device can be a microcontroller, special purpose logic circuitry (e.g., a field programmable gate array (FPGA), an application specific integrated circuit (ASIC), etc.), or another suitable processor.

In one embodiment, the memory regions 111, 113, . . . , 119 can include any combination of different types of non-volatile memory components. Furthermore, the memory cells of the memory regions can be grouped as memory pages or data blocks that can refer to a unit used to store data. In some embodiments, the volatile memory 123 can be, but are not limited to, random access memory (RAM), dynamic random access memory (DRAM), and synchronous dynamic random access memory (SDRAM).

In one embodiment, one or more controllers of the memory system 105 can communicate with the memory regions 111, 113, . . . , 119 to perform operations such as reading data, writing data, or erasing data. Each controller can include hardware such as one or more integrated circuits and/or discrete components, a buffer memory, or a combination thereof. Each controller can be a microcontroller, special purpose logic circuitry (e.g., a field programmable gate array (FPGA), an application specific integrated circuit (ASIC), etc.), or another suitable processor. The controller(s) can include a processing device (processor) configured to execute instructions stored in local memory. In one example, local memory of the controller includes an embedded memory configured to store instructions for performing various processes, operations, logic flows, and routines that control operation of the memory system 105, including handling communications between the memory system 105 and the host system 101. In some embodiments, the local memory can include memory registers storing memory pointers, fetched data, etc. The local memory can also include read-only memory (ROM) for storing micro-code.

In general, controller(s) of memory system 105 can receive commands or operations from the host system 101 and/or processing device 109 and can convert the commands or operations into instructions or appropriate commands to achieve selection of a memory region based on data write counters for the memory regions. The controller can also be responsible for other operations such as wear-leveling, garbage collection operations, error detection and error-correcting code (ECC) operations, encryption operations, caching operations, and address translations between a logical block address and a physical block address that are associated with the memory regions. The controller can further include host interface circuitry to communicate with the host system 101 via the physical host interface. The host interface circuitry can convert the commands received from the host system into command instructions to access one or more of the memory regions as well as convert responses associated with the memory regions into information for the host system 101.

The memory system 105 can also include additional circuitry or components that are not illustrated. In some embodiments, the memory system 105 can include a cache or buffer (e.g., DRAM or SRAM) and address circuitry (e.g., a row decoder and a column decoder) that can receive an address from one or more controllers and decode the address to access the memory regions.

In some embodiments, a controller in the host system 101 or memory system 105, and/or the processing device 109 includes at least a portion of the write counter component 107. For example, the controller and/or the processing device 109 can include logic circuitry implementing the write counter component 107. For example, a processing device (processor) can be configured to execute instructions stored in memory for performing operations that provide read/write access to memory regions for the write counter component 107 as described herein. In some embodiments, the write counter component 107 is part of an operating system, a device driver, or an application.

Figure 2:
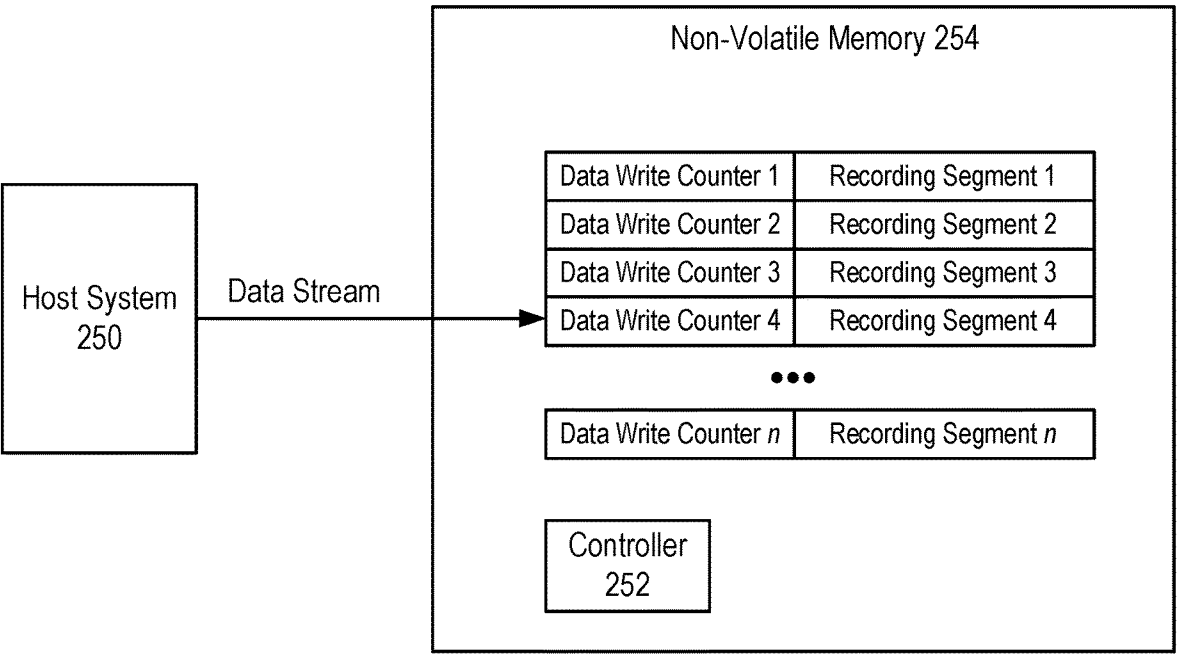
FIG. 2 illustrates an example memory system that selects a recording segment to receive new data for recording based on values of data write counters, in accordance with some embodiments of the present disclosure.

FIG. 2 illustrates an example non-volatile memory 254 that selects a recording segment to receive new data (e.g., a sequential data stream) for recording based on values of data write counters 1-n, in accordance with some embodiments of the present disclosure. Non-volatile memory 254 is an example of memory system 105. In one example, non-volatile memory 254 is a flash memory device and/or a solid-state drive (SSD).

Controller 252 maintains the data write counters 1-n for recording segments 1-n. Each data write counter corresponds to one of the recording segments. Controller 252 is an example of processing device 109.

Controller 252 scans the data write counters to select one of the recording segments for receiving a data stream from host system 250. The data write counters are scanned by determining the values of the data write counters and comparing the values in order to identify a data write counter having a lower value. In one example, the identified data write counter (e.g., Data Write Counter 4) has a minimum value as compared to all other data write counters. In another example, the identified write counter has a value lower than at least one other data write counter.

The recording segment that is selected to be active for recording new data is that recording segment which corresponds to the identified data write counter. When non-volatile memory 254 initiates recording of data from host system 250, the data will be stored in the selected recording segment.

In one embodiment, controller 252 divides the physical memory space of non-volatile memory 254 into recording segments of equal size. In other embodiments, the recording segments can have different sizes. For example, the size of a recording segment can correspond to a type of data that is being recorded and/or the size can be determined based on context data received from host system 250. In one example, the context data is based on sensor data received from sensors of an autonomous vehicle.

As data is received from host system 250, controller 252 writes the received data to the active recording segment (e.g., Recording Segment 4). The data write counter corresponding to the active recording segment is incremented as the received data is written to the active recording segment. In one example, the data write counter is incremented based on the quantity of data that is written to the active recording segment. In one example, the value of the data write counters is incremented based on a number of bits or bytes of data that is written.

In one embodiment, host system 250 can collect data from sensors of an embedded system. For example, the sensors can be located on an autonomous vehicle and collect image data used for navigation of the vehicle. In one embodiment, the sensor data is input to a neural network and an output is used to control the vehicle. In one embodiment, processing by the neural network is used to provide result data to controller 252 for selecting a recording segment.

In one embodiment, a neural network is trained or operated using controller 252. During training or other operation of the neural network, data is read and written to and from volatile memory (e.g., volatile memory 123).

In one embodiment, the controller 252 can include hardware such as one or more integrated circuits and/or discrete components, a buffer memory, or a combination thereof. The controller can be a microcontroller, special purpose logic circuitry (e.g., a field programmable gate array (FPGA), an application specific integrated circuit (ASIC), etc.), or another suitable processor. The controller can include one or more processors (processing devices) configured to execute instructions stored in local memory.

Local memory of the controller can include an embedded memory configured to store instructions for performing various processes, operations, logic flows, and routines that control aspects of operation for the memory system. Local memory of the controller can include read-only memory (ROM) for storing micro-code and/or memory registers storing, for example, memory pointers, fetched data, etc.

Figure 3:
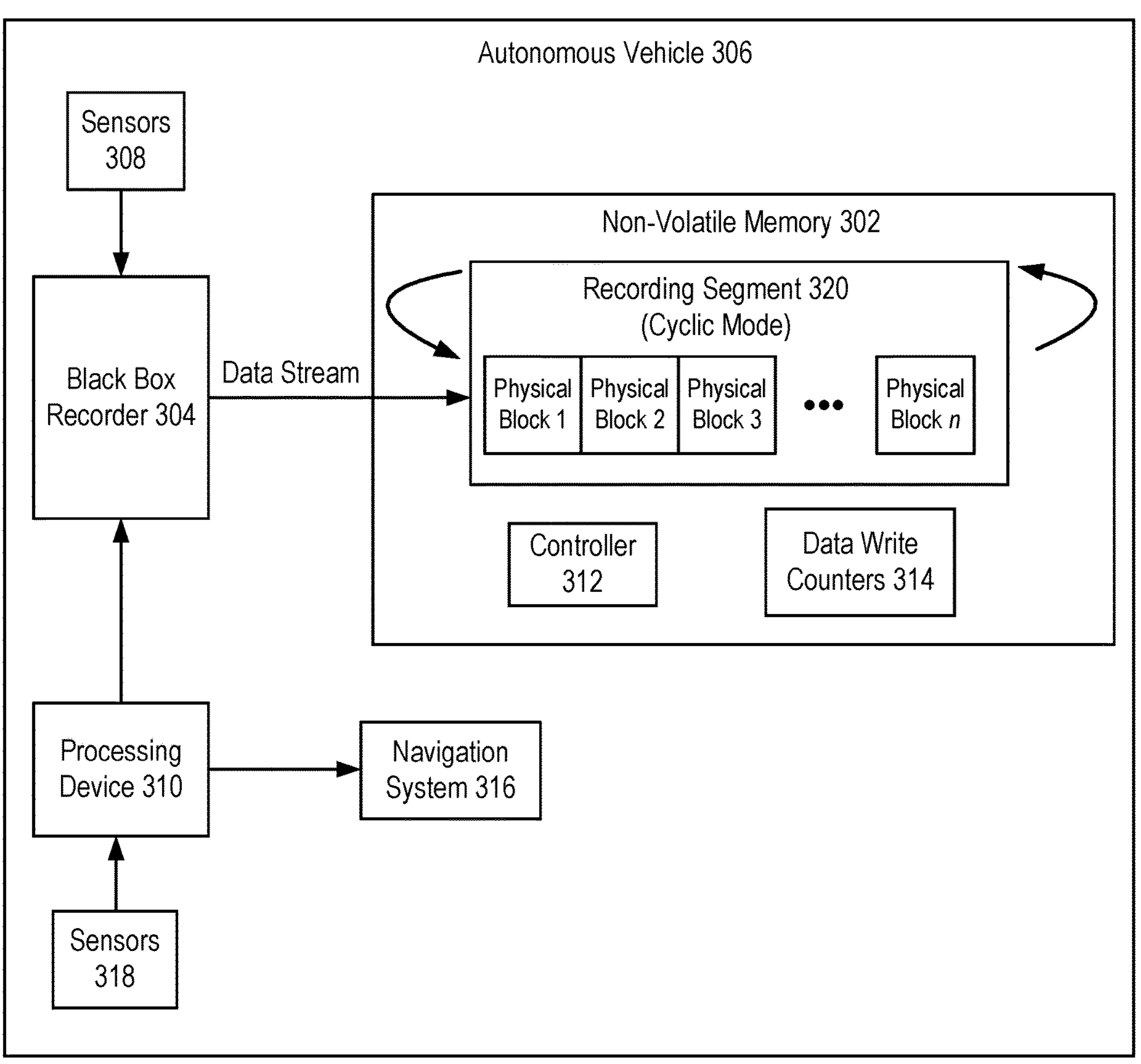
FIG. 3 illustrates an example autonomous vehicle having a non-volatile memory that stores data from a data stream into a selected recording segment using a cyclic mode, in accordance with some embodiments of the present disclosure.

FIG. 3 illustrates an example autonomous vehicle 306 having a non-volatile memory 302 that stores data from a data stream into a selected recording segment 320 using a cyclic mode, in accordance with some embodiments of the present disclosure. The data stream is received from a black box recorder 304. Black box recorder 304 selects data from sensors 308 of autonomous vehicle 306 and/or data provided by processing device 310 for including in the data stream sent to non-volatile memory 302.

In one embodiment, the data stream includes run-time data generated by one or more software processes of processing device 310. In one example, the software process collects sensor data from sensors 318. In one example, the software process controls navigation system 316 and/or provides data from sensors associated with navigation system 316.

Non-volatile memory 302 is an example of memory system 105. Recording segment 320 is an example of Recording Segment 4 of FIG. 2 or memory region 111. Black box recorder 304 is an example of host system 250.

Controller 312 controls the writing of data into recording segment 320. Controller 312 has selected recording segment 320 as the active recording segment based on scanning data write counters 314.

Controller 312 divides the non-volatile memory 302 into sets of physical blocks to provide recording segments (e.g., recording segment 320). For example, recording segment 320 includes physical blocks 1-n.

In one example, the physical blocks generally can be implemented using flash memories of two or more types, such as SLC, MLC, TLC, and/or QLC flash memories. SLC flash memory is reliable with a large P/E budget, but is expensive (e.g., on a per-bit basis when manufactured on an integrated circuit die of a given size); MLC flash memory has a medium P/E budget and is less expensive (e.g., on a per-bit basis when manufactured on an integrated circuit die of a given size); TLC and QLC flash memories are cheap (e.g., on a per-bit basis when manufactured on an integrated circuit die of a given size) to manufacture but have smaller P/E budgets. Using a custom ratio of physical blocks of different types offers customized trade-offs between costs and benefits in a statistical sense. In one example, each recording segment may use flash memory cells of the same type. In another example, each recording segment (or each group of many groups of segments) may use different types of flash memory cells.

Data is recorded to recording segment 320 in a cyclic mode. For example, when recording segment 320 becomes full, the oldest recorded data is replaced by new data received from black box recorder 304.

In one embodiment, black box recorder 304 start sending data to non-volatile memory 302 when black box recorder 304 receives a command to start recording. In one example, the command to start recording is provided by processing device 310. In one example, processing device 310 controls navigation system 316. In one example, the command to start recording is provided when the autonomous vehicle 306 enters into an autonomous navigation mode.

In one embodiment, controller 312 selects a new recording segment for recording of subsequent data. For example, controller 312 selects the new recording segment in response to the black box recorder 304 receiving a command to stop recording. The new recording segment is selected based on scanning the data write counters 314, as described herein. When black box recorder 304 resumes sending data, controller 312 writes the data to the newly-selected recording segment.

Figure 4:
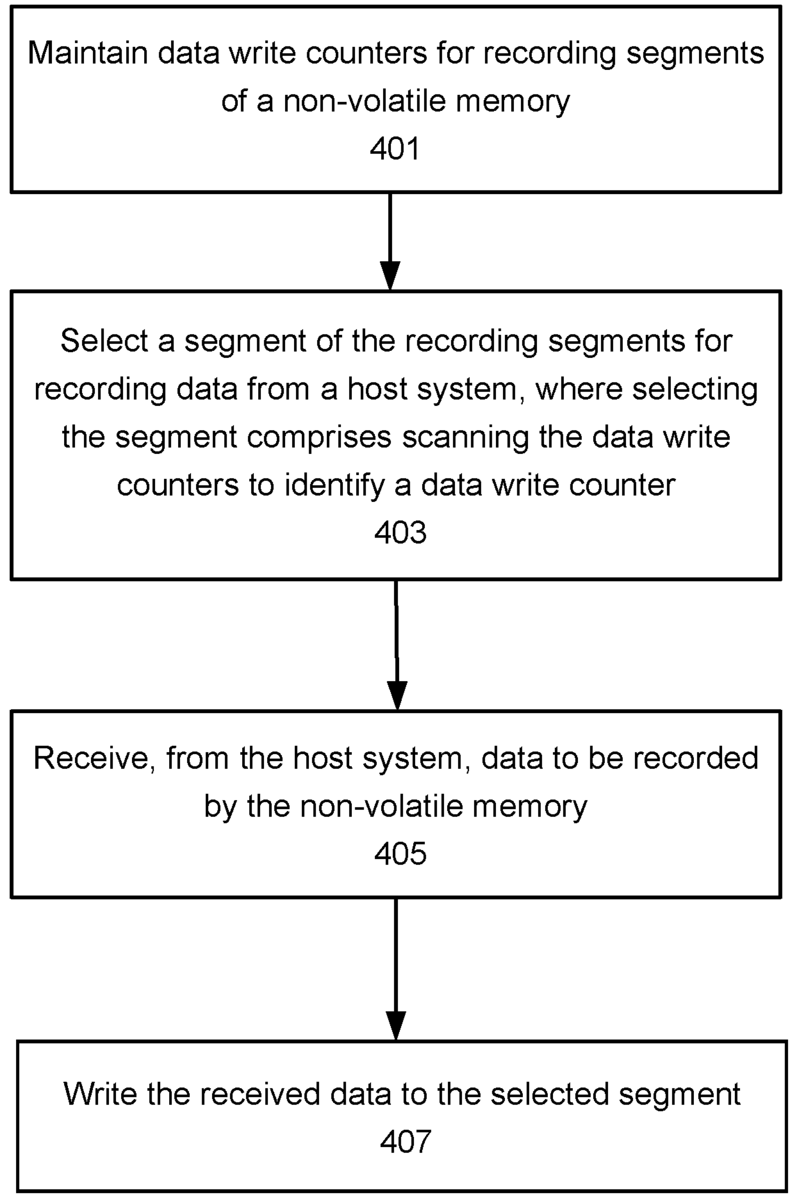
FIG. 4 is a flow diagram of an example method of selecting a recording segment based on scanning of data write counters, in accordance with some embodiments of the present disclosure.

FIG. 4 is a flow diagram of an example method of selecting a recording segment based on scanning of data write counters, in accordance with some embodiments of the present disclosure. For example, the method of FIG. 4 can be implemented in the system of FIGS. 1-3.

The method of FIG. 4 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method of FIG. 4 is performed at least in part by the write counter component 107 of FIG. 1.

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 401, data write counters for recording segments of a non-volatile memory are maintained. For example, controller 312 maintains data write counters 314 of non-volatile memory 302.

At block 403, a segment of the recording segments is selected for recording data from a host system. Selecting a segment includes scanning the data write counters to identify one of the data write counters (e.g., having a minimum or lower value for quantity of data written). For example, data write counters 314 are scanned by controller 312 to select the data write counter that corresponds to recording segment 320.

At block 405, data to be recorded by the non-volatile memory is received from the host system. For example, host system 250 provides the data stream to non-volatile memory 254.

At block 407, the data received from the host system is written to the selected segment. For example, a sequential data stream from black box recorder 304 is written to recording segment 320 in a cyclic mode.

In one aspect, the present disclosure includes computing apparatuses performing any of the methods and non-transitory computer-readable storage media storing instructions that, when executed by a processing device, cause the processing device to perform any of the methods.

In one embodiment, a method for a controller comprises: maintaining data write counters (e.g., 314) for recording segments of a non-volatile memory (e.g., 302), wherein each of the data write counters corresponds to a respective recording segment; selecting a first segment (e.g., 320) of the recording segments for recording data from a host system (e.g., 250), wherein selecting the first segment comprises scanning the data write counters to identify a first data write counter corresponding to the first segment; receiving, from the host system, data to be recorded by the non-volatile memory; and writing the received data to the first segment.

In one embodiment, the host system is a black box recorder (e.g., 304) for an autonomous vehicle.

In one embodiment, the received data is a data stream from the black box recorder.

In one embodiment, the method further comprises dividing the non-volatile memory into sets of physical blocks (e.g., Physical Blocks 1-n of FIG. 3) to provide the recording segments, each set of physical blocks corresponding to a recording segment.

In one embodiment, dividing the non-volatile memory provides recording segments of equal size.

In one embodiment, identifying the first data write counter comprises comparing values of the data write counters.

In one embodiment, a value of the first data write counter is lower than a value of at least one other of the data write counters.

In one embodiment, the value of the first data write counter is lower than values of all other of the data write counters.

In one embodiment, the method further comprises incrementing the first data write counter as the received data is written to the first segment.

In one embodiment, the first data write counter is incremented based on a quantity of data written to the first segment.

In one embodiment, a system comprises: at least one processing device (e.g., controller 312 or processing device 109); and memory storing instructions configured to instruct the at least one processing device to: maintain data write counters for recording segments of a non-volatile memory, wherein each of the data write counters corresponds to a respective recording segment; select a first segment of the recording segments for recording data from a host system, wherein selecting the first segment comprises scanning the data write counters to identify a first data write counter corresponding to the first segment; receive, from the host system, data to be recorded by the non-volatile memory; and write the received data to the first segment.

In one embodiment, each of the data write counters is incremented based on a quantity of data written to the recording segment corresponding to the respective data write counter.

In one embodiment, the host system is a black box recorder for an autonomous vehicle, and the received data is a data stream from the black box recorder. For example, automakers typically want to record raw vehicle sensor data of the autonomous vehicle at all times. However, extended recordings of raw data can be viewed as prohibitively expensive. The black box recorder records vehicle sensor data generated immediately prior to and possibly during an event (e.g., collision or near collision involving the respective vehicle or vehicle nearby), and/or can record the vehicle sensor data in the event of a power loss.

In one embodiment, writing the received data to the first segment comprises writing the data stream to the first segment in a cyclic mode.

In one embodiment, the host system starts sending the data to be recorded when the black box recorder receives a command to start recording, the command to start recording is provided by a computing device of the autonomous vehicle, and the computing device controls an autonomous navigation system.

In one embodiment, the instructions are further configured to instruct the at least one processing device to: in response to the black box recorder receiving a command to stop recording, select a second segment of the recording segments for recording subsequent data received from the host system, wherein the second segment is selected based on comparing values of the data write counters; receive the subsequent data; and write the subsequent data to the second segment.

In one embodiment, a non-transitory computer-readable storage medium stores instructions that, when executed by at least one processing device, cause the at least one processing device to perform a method, the method comprising: maintaining data write counters for recording segments of a memory, wherein each of the data write counters corresponds to a respective recording segment; selecting a first segment of the recording segments for recording data, wherein selecting the first segment comprises scanning the data write counters to identify a first data write counter corresponding to the first segment; receiving data to be recorded by the memory; and writing the received data to the first segment.

In one embodiment, writing the received data to the first segment comprises writing the data to the first segment in a cyclic mode.

In one embodiment, the received data is a sequential data stream.

In one embodiment, identifying the first data write counter comprises comparing values of the data write counters.

Figure 5:
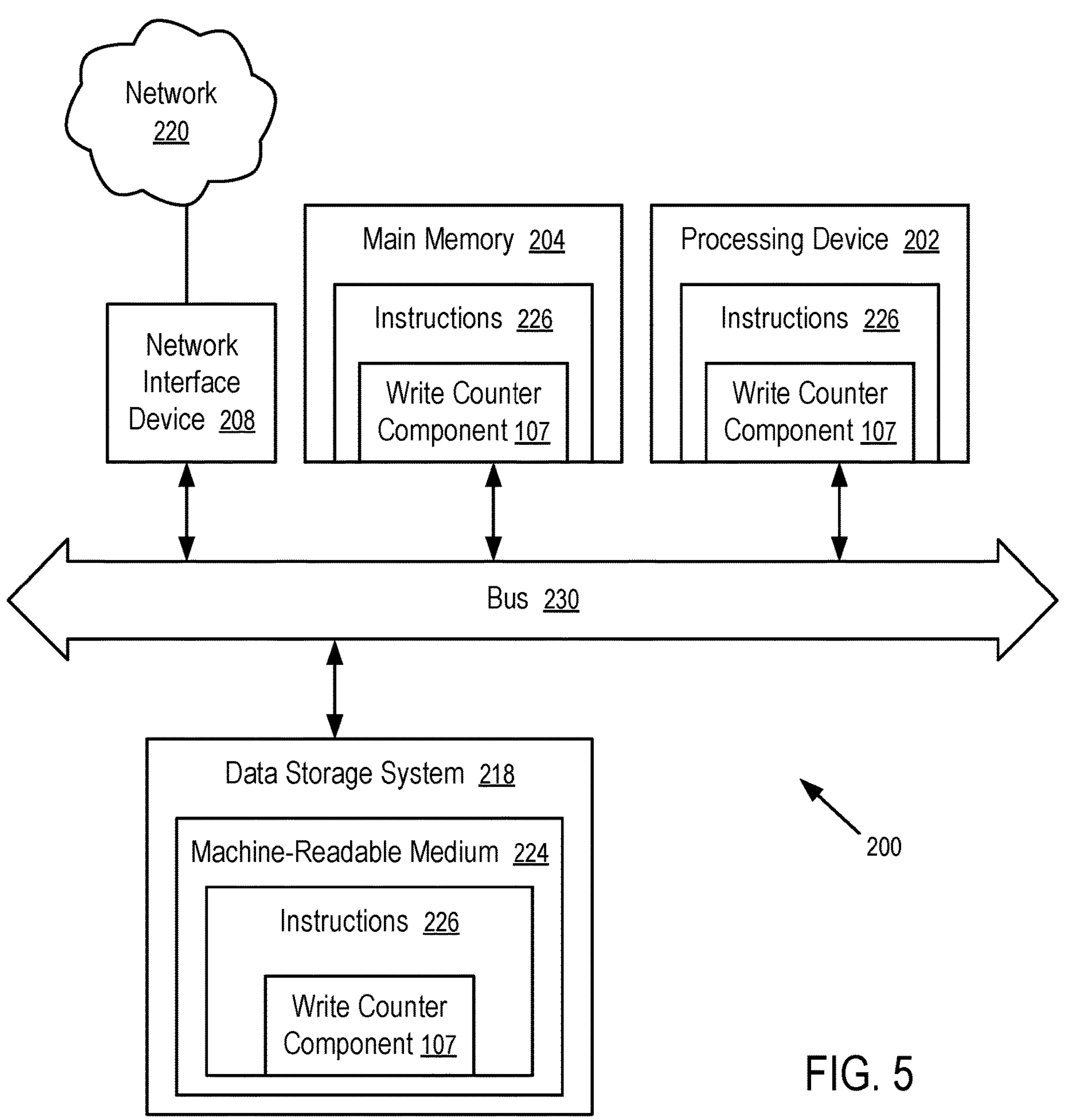
FIG. 5 is a block diagram of an example computer system in which embodiments of the present disclosure can operate.

FIG. 5 is a block diagram of an example computer system 200 in which embodiments of the present disclosure can operate. In one embodiment, in computer system 200 a set of instructions, for causing a machine to perform any one or more of the methodologies discussed herein, can be executed. In some embodiments, the computer system 200 can correspond to a memory system, or to a host system that includes, is coupled to, or utilizes a memory system (e.g., the memory system 105 of FIG. 1) or can be used to perform the operations of a write counter component 107 (e.g., to execute instructions to perform operations corresponding to the write counter component 107 described with reference to FIGS. 1-4). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 200 includes a processing device 202, a main memory 204 (e.g., read-only memory (ROM), flash memory, dynamic random access memory (DRAM) such as synchronous DRAM (SDRAM) or Rambus DRAM (RDRAM), static random access memory (SRAM), etc.), and a data storage system 218, which communicate with each other via a bus 230 (which can include multiple buses).

Processing device 202 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 202 can also be one or more special-purpose processing devices such as an application specific integrated circuit (ASIC), a field programmable gate array (FPGA), a digital signal processor (DSP), network processor, or the like. The processing device 202 is configured to execute instructions 226 for performing the operations and steps discussed herein. The computer system 200 can further include a network interface device 208 to communicate over the network 220.

The data storage system 218 can include a machine-readable storage medium 224 (also known as a computer-readable medium) on which is stored one or more sets of instructions 226 or software embodying any one or more of the methodologies or functions described herein. The instructions 226 can also reside, completely or at least partially, within the main memory 204 and/or within the processing device 202 during execution thereof by the computer system 200, the main memory 204 and the processing device 202 also constituting machine-readable storage media. The machine-readable storage medium 224, data storage system 218, and/or main memory 204 can correspond to the memory system 105 of FIG. 1.

In one embodiment, the instructions 226 include instructions to implement functionality corresponding to a write counter component (e.g., the write counter component 107 described with reference to FIGS. 1-4). While the machine-readable storage medium 224 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:

a black box recorder; and non-volatile memory;

wherein the system is configured to partition the non-volatile memory into a plurality of recording segments;

wherein the system is configured to record a data stream in a cyclic mode within a currently selected recording segment among the plurality of recording segments until a next recording segment is selected;

wherein the system is configured to maintain a plurality of data write counters for the plurality of recording segments respectively, each respective data write counter among the plurality of data write counters configured to identify a quantity of data having been written to a respective recording segment among the plurality of recording segments; and wherein the system is configured to select the currently selected recording segment and the next recording segment based on values of the data write counters.

2. The system of claim 1, wherein the non-volatile memory is further configured to select the next recording segment in response to the black box recorder receiving a command.

3. The system of claim 1, further comprising data write counters, wherein the system is configured to scan the plurality of data write counters in selecting the currently selected recording segment.

4. The system of claim 1, further comprising a sensor, wherein the system is configured to select the currently selected recording segment based at least in part on data from the sensor.

5. The system of claim 1, wherein the system is further configured to update the respective data write counter based on a portion of the data stream being stored cyclically into the respective recording segment.

6. An apparatus comprising:

a sensor configured to provide sensor data as a data stream;

memory partitioned into a plurality of memory regions and configured to store, in a cyclic mode, the data stream in a currently selected memory region, among the plurality of memory regions, until a next memory region is selected to record the data stream;

a neural network configured to use the sensor data as input;

a controller configured to use the neural network to select the currently selected memory region, and to navigate a vehicle; and a plurality of write counters maintained for the plurality of memory regions respectively, each respective write counter among the plurality of write counters configured to identify a quantity of data having been written to a respective memory region among the plurality of memory regions, wherein the controller is further configured to select, based on values of the write counters, the currently selected memory region and the next memory region.

7. The apparatus of claim 6, wherein the controller is further configured to write the sensor data to the currently selected memory region in response to selecting the currently selected memory region.

8. The apparatus of claim 6, wherein the controller is further configured to select the currently selected memory region based in part on at least one software process executing on an autonomous vehicle.

9. The apparatus of claim 6, the write counters each configured to indicate a quantity of data programmed to a respective memory region, wherein the controller is further configured to determine which of the write counters indicates a lowest quantity of data.

10. The apparatus of claim 6, wherein the currently selected memory region is selected based on a type of data to be stored in the currently selected memory region.

11. The apparatus of claim 6, wherein the currently selected memory region is selected based on a type of storage cell used in the currently selected memory region.

12. A method comprising:

dividing a memory space into a plurality of recording segments;

writing, in a cyclic mode, a data stream to an active recording segment, selected from the plurality of recording segments, until a next recording segment is selected;

maintaining a plurality of write counters for the plurality of recording segments respectively, each respective write counter among the plurality of write counters configured to identify a quantity of data having been written to a respective recording segment among the plurality of recording segments, including incrementing a first write counter pre-associated with the active recording segment as the data is written to the active recording segment; and selecting the active recording segment and the next recording segment based at least in part on values of the write counters.

13. The method of claim 12, further comprising selecting a respective size for each recording segment, among the plurality of recording segments, based on context data received from a host system.

14. The method of claim 13, wherein the context data comprises data from sensors of a vehicle.

15. The method of claim 13, wherein the respective size is selected based at least in part on a type of data being recorded.

16. The method of claim 12, further comprising comparing values of write counters to select the active recording segment.

17. The method of claim 12, wherein the first write counter is incremented based on a quantity of data written to the active recording segment.

* * * * *